Patented Aug. 11, 1931

1,817,983

UNITED STATES PATENT OFFICE

CLARK C. HERITAGE, OF BUFFALO, NEW YORK, ASSIGNOR TO NATIONAL ANILINE & CHEMICAL CO., INC., OF NEW YORK, N. Y., A CORPORATION OF NEW YORK

HEAT ABSTRACTION

No Drawing.    Application filed July 30, 1925. Serial No. 47,124.

This invention relates to heat abstraction and, in its particular application, to the use of liquid systems for securing such abstraction.

Some liquid systems display changes in the fusion point with changes in proportion or in concentration. For example, sulfuric acid of a certain definite concentration has a low fusion point, while more dilute or more concentrated solutions of the same acid have higher fusion points.

It is an object of this invention to cause a depression in the absolute temperature of a liquid system by means of this property. It is a further object to utilize this property of liquid systems to secure lower temperatures than are otherwise commercially or easily attainable. These and other objects will appear from the following description.

A method by which this property of liquid systems is utilized is as follows: Two or more liquid systems are so selected that a combination thereof has a lower fusion point than any of the systems separately; that is, the temperature at which a solid phase can exist in equilibrium with a liquid phase in the combined system is lower than the fusion points of the original liquid systems. Latent heat of fusion is abstracted from each of the systems separately, as by freezing into the form of slush which contains a solid phase in equilibrium with a liquid phase, and they are thereupon mixed. The resulting mixture contains the solid phases which were present in the original systems and which were in equilibrium at their original temperatures. But since the fusion point of the mixture is lower than the fusion point of said solid phase they tend to fuse, and the slush tends to liquefy. If external heat is not provided, sensible heat must be abstracted from the system to supply the latent heat required, and a lowered temperature consequently results. The combined liquid system is thereupon available for cooling purposes at the depressed temperature.

As a specific illustration of this method, 162 grams of $H_2SO_4$ and 108 grams of $H_2SO_4.H_2O$ or acids of about 100 per cent and 85 per cent concentrations are separately reduced to slush form at about 10.5° C. and 8° C., respectively, by cooling. The slushes contain the sulfuric acids in the solid phase in equilibrium with liquid phases containing sulfuric acids of 100 per cent and 85 per cent concentrations, respectively. These slushes are then mixed, giving an acid of about 94 per cent concentration, and the temperature quickly drops to −25° C. to −30° C., the melting point of 94 per cent acid being about −30° C. The latent heat required in melting the slush is taken up from the sensible heat of the combined systems. Consequently the temperature of the acid is depressed by the melting of the slush, the limit of such depression being the melting point of the mixture. By diluting a similar slush prepared from a 95 to 100 per cent sulfuric acid with a slush prepared from an 84 to 91 per cent sulfuric acid, similar or analogous results are secured.

A practical application of this invention is in the manufacture of indophenols, as from carbazol and nitrosophenol where low temperatures are of extreme importance. By separately freezing solutions of sulfuric acid as above specified and then mixing them, a lowered temperature results. To the resulting system having a temperature of −25° C. to −30° C. is added the carbazol and nitrosophenol mixture for the production of the dye intermediate. The necessary low temperature, not otherwise readily obtainable, is thus secured.

A modification of this method consists in the addition of mutually reactive substances to the separate systems prior to the mixing of the systems. For instance, instead of prior mixture of the systems in the production of an indophenol, the carbazol is added to $H_2SO_4$ and cooled to a slush, and nitrosophenol is dissolved in $H_2SO_4.H_2O$ and also cooled to a slush; the carbazol slush is added to the nitrosophenol slush and the reaction immediately sets in.

An advantage of the methods illustrated is that the reacting components can be charged more rapidly at low temperatures than by any known method unless a highly specialized refrigerating system is used. A minimum time cycle is thus made available in conjunction with a low temperature.

Instead of direct addition of the systems, it is evident that heat may be abstracted through a heat transferring medium in a manner similar to the use of other cooling systems. Moreover, while the preceding description has been directed for the purposes of disclosure to systems that are regarded and defined as liquids under normal conditions of pressure and temperature it is to be understood that the invention contemplates the use of other systems which include phases that are fluid under normal conditions and which display a variation in the point at which a change of state occurs upon admixture.

I claim:

1. In the manufacture of indophenol and related compounds, the step which comprises mixing a system containing sulfuric acid of 84 to 91 per cent. concentration, and including sulfuric acid in the solid phase, with a system containing sulfuric acid of 95 to 100 per cent. concentration, and including sulfuric acid in the solid phase, one of said systems containing a carbazol compound and the other of said systems containing a nitrosophenol compound.

2. In the manufacture of carbazol indophenol, the step which comprises mixing a system containing sulfuric acid of 84 to 91 per cent. concentration, and including sulfuric acid in the solid phase, with a system containing sulfuric acid of 95 to 100 per cent. concentration, and including sulfuric acid in the solid phase, one of said systems containing carbazol and the other of said systems containing nitrosophenol.

3. In the manufacture of indophenols and related compounds, the improvement which comprises mixing a system containing sulfuric acid in the solid phase in equilibrium with a liquid phase of sulfuric acid of 84 to 91 per cent. concentration with a system containing sulfuric acid in the solid phase in equilibrium with a liquid phase of sulfuric acid of 95 to 100 per cent. concentration, said systems being mixed in proportions such as to give after mixing a system containing sulfuric acid of about 92 to 94 per cent. concentration, and reacting a carbazol with a nitrosophenol in the resulting mixture while said mixture is at a low temperature resulting from said mixing of said systems.

4. In the manufacture of indophenols and related compounds, the step which comprises mixing a system containing sulfuric acid in the solid phase in equilibrium with a liquid phase of sulfuric acid of 84 to 91 per cent. concentration with a system containing sulfuric acid in the solid phase in equilibrium with a liquid phase of sulfuric acid of 95 to 100 per cent. concentration, one of said systems containing a carbazol and the other of said systems containing a nitrosophenol, said systems being mixed in proportions such as to give after mixing a system containing sulfuric acid of about 92 to 94 per cent. concentration.

5. In the manufacture of carbazol indophenol, the step which comprises mixing a system containing sulfuric acid in the solid phase in equilibrium with a liquid phase of sulfuric acid of about 85 per cent. concentration with a system containing sulfuric acid in the solid phase in equilibrium with a liquid phase of sulfuric acid of about 100 per cent. concentration, one of said systems containing carbazole and the other of said systems containing nitrosophenol, said systems being mixed in proportions such as to give after mixing a system containing sulfuric acid of about 94 per cent. concentration.

6. The improvement in the method of carrying out reactions at low temperatures, which comprises forming a system containing one of a pair of mutually reactive substances and sulfuric acid, and including sulfuric acid in the solid phase; forming another system containing the other of said mutually reactive substances and sulfuric acid of a different concentration; and mixing said systems in proportions such as to give after mixing a system containing sulfuric acid of a concentration such that its fusion point is lower than the fusion points of said other sulfuric acids.

7. The improvement in the method of carrying out reactions at low temperatures, which comprises forming a system containing one of a pair of mutually reactive substances and sulfuric acid, and including sulfuric acid in the solid phase; forming another system containing the other of said mutually reactive substances and sulfuric acid of a different concentration, and including sulfuric acid in the solid phase; and mixing said systems in proportions such as to give after mixing a system containing sulfuric acid of a concentration such that its fusion point is lower than the fusion points of said other sulfuric acids.

8. The improvement in the method of carrying out reactions at low temperatures, which comprises forming a system containing one of a pair of mutually reactive substances and sulfuric acid of 84 to 91 per cent. concentration; forming another system containing the other of said mutually reactive substances and sulfuric acid of 95 to 100 per cent. concentration; said systems being cooled and one of said systems including sulfuric acid in the solid phase; and mixing said systems.

9. The improvement in the method of carrying out reactions at low temperatures, which comprises forming a system containing one of a pair of mutually reactive substances and sulfuric acid of 84 to 91 per cent. concentration, and including sulfuric acid in the solid phase; forming another system containing the other of said mutually reactive substances and sulfuric acid of 95 to 100 per cent. concentration, and including sulfuric acid in the solid phase; and mixing said systems.

10. The improvement in the method of carrying out reactions at low temperatures, which comprises forming a system containing one of a pair of mutually reactive substances and sulfuric acid of about 85 per cent. concentration, and including sulfuric acid in the solid phase; forming another system containing the other of said mutually reactive substances and sulfuric acid of about 100 per cent. concentration, and including sulfuric acid in the solid phase; and mixing said systems in proportions such as to give after mixing a system containing sulfuric acid of about 92 to 94 per cent. concentration.

11. The improvement in the method of carrying out reactions at low temperatures, which comprises cooling a mixture containing one of a pair of mutually reactive substances and sulfuric acid of 84 to 91 per cent. concentration to solidify said sulfuric acid, cooling a mixture containing the other of said mutually reactive substances and sulfuric acid to 95 to 100 per cent. concentration to solidify said sulfuric acid, and admixing said cooled mixtures in proportions such as to produce an admixture containing sulfuric acid of about 92 to 94 per cent. concentration.

In testimony whereof I affix my signature.

C. C. HERITAGE.